(12) United States Patent
Sorensen et al.

(10) Patent No.: US 9,880,269 B2
(45) Date of Patent: Jan. 30, 2018

(54) APPARATUS AND METHODS FOR DIMENSIONING AN OBJECT CARRIED BY A VEHICLE MOVING IN A FIELD OF MEASUREMENT

(71) Applicant: Mettler-Toledo GmbH, Greifensee (CH)

(72) Inventors: Einar Sorensen, Oslo (NO); Espen Rutger, Oslo (NO); Kjell Krakenes, Oslo (NO); Eivind Kvedalen, Oslo (NO)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 15/423,676

(22) Filed: Feb. 3, 2017

(65) Prior Publication Data
US 2017/0227629 A1  Aug. 10, 2017

(30) Foreign Application Priority Data
Feb. 4, 2016 (EP) .................................... 16154190

(51) Int. Cl.
*G08B 3/00* (2006.01)
*G01S 7/51* (2006.01)
(Continued)

(52) U.S. Cl.
CPC .............. *G01S 7/51* (2013.01); *B66F 9/0755* (2013.01); *B66F 9/07504* (2013.01); *G01B 11/00* (2013.01); *G01B 11/02* (2013.01); *G01B 11/04* (2013.01); *G01B 11/245* (2013.01); *G01G 19/083* (2013.01); *G01S 7/4817* (2013.01); *G01S 7/4915* (2013.01); *G01S 17/89* (2013.01); *G06Q 50/28* (2013.01)

(58) Field of Classification Search
None
See application file for complete search history.

(56) References Cited

U.S. PATENT DOCUMENTS 5,742,068 A  4/1998  Dybdahl et al.
5,831,737 A * 11/1998  Stringer ................. G01B 11/00
                                              250/559.24

(Continued)

FOREIGN PATENT DOCUMENTS

CN       201926427 U    8/2011
KR  10-2013-0032091 A   4/2013

*Primary Examiner* — Julie Lieu
(74) *Attorney, Agent, or Firm* — Standley Law Group LLP (57) ABSTRACT

The dimensions of an object are measured as it is transported by a forklift within an area of measurement. A first scanner is on a first side of the area of measurement; a second scanner is on an opposite second side and across the first scanner. The first and second scanners provide a dual-head scanner arrangement to capture dimensions of the object. A third scanner is on the first side of the area of measurement, parallel to the first scanner. The first and third scanners are configured to capture speed and direction of the object. Each scanner has a processor to operate it. The first and second scanners are synchronized, and operation of the first and third scanners is correlated. Placement of the first and second scanners establishes a width of the area of measurement and the first and third scanners establish a length thereof.

18 Claims, 7 Drawing Sheets

(51) Int. Cl.

| | |
|---|---|
| *B66F 9/075* | (2006.01) |
| *G01B 11/02* | (2006.01) |
| *G01G 19/08* | (2006.01) |
| *G01S 7/481* | (2006.01) |
| *G01S 7/491* | (2006.01) |
| *G01S 17/89* | (2006.01) |
| *G01B 11/00* | (2006.01) |
| *G01B 11/04* | (2006.01) |
| *G01B 11/245* | (2006.01) |
| *G06Q 50/28* | (2012.01) |

(56) References Cited

U.S. PATENT DOCUMENTS

| | | | | |
|---|---|---|---|---|
| 5,923,428 | A * | 7/1999 | Woodworth | G01B 11/04 |
| | | | | 356/623 |
| 5,991,041 | A * | 11/1999 | Woodworth | G01B 11/04 |
| | | | | 356/602 |
| 6,115,114 | A | 9/2000 | Berg et al. | |
| 6,332,098 | B2 | 12/2001 | Ross et al. | |
| 6,611,787 | B2 | 8/2003 | Stringer et al. | |
| 6,798,528 | B1 | 9/2004 | Hartman | |
| 6,847,859 | B2 * | 1/2005 | Nuebling | G01B 11/04 |
| | | | | 198/502.2 |
| 6,880,756 | B2 | 4/2005 | Tsikos et al. | |
| 7,757,946 | B2 * | 7/2010 | Kienzle-Lietl | G01G 9/00 |
| | | | | 235/383 |
| 2007/0181685 | A1 * | 8/2007 | Zhu | B82Y 15/00 |
| | | | | 235/454 |
| 2011/0290567 | A1 | 12/2011 | Waggoner et al. | |

* cited by examiner

APPARATUS AND METHODS FOR DIMENSIONING AN OBJECT CARRIED BY A VEHICLE MOVING IN A FIELD OF MEASUREMENT

CROSS-REFERENCE TO RELATED APPLICATIONS

This application is entitled to benefit of a right of priority from European Patent Application No. 16154190.9, filed on 4 Feb. 2016. The content of that application is incorporated by reference as if fully recited herein.

TECHNICAL FIELD

The invention relates to a system and a method for dynamically dimensioning an object wherein the object is preferably placed on a pallet and is transported by a forklift vehicle moving along an area of measurement. Within the area of measurement, the object being transported by the forklift vehicle is to be dimensioned by means of an arrangement of scanners.

BACKGROUND

Industrially, product dimensioning involves the estimation of the amount of space a shipment will occupy in a trailer or warehousing. This approach is precisely used for a variety of applications including product consistency, inventory monitoring, revenue enhancement for the transportation industry and placement onto air-, rail-, and ground-transport vehicles as well as monitoring of cargo.

Dimensioning of objects, such as parcels or bundles thereof located on a pallet etc., involves measuring and capturing an area or volume that the object occupies. Efficient and cost-effective pricing for dimensioning would take into consideration the volumetric weight also known as dimensional weight of an object, which provides values particularly useful in the storage, handling, shipping and invoicing of such objects. This is attributed to the fact that pricing of light weight goods occupying a large volume based on weight only would result in inappropriate pricing in the so-called less-than-truckload (LTL) industry.

Traditionally, dimensioning was carried out manually by way of processes such as manual measurements of the objects followed by manually entering data into a computer system. However, such manual methods are always prone to human errors and may result in either overcharging or undercharging a customer. Subsequently, over time, the LTL industry has incorporated various automatic methods and solutions to dimension objects in warehouses, such as incorporating laser ranging and scanning systems on a conveyor to measure dimensions of parcels. Alternatively, when dimensioning objects that are located on a pallet and transported by a forklift vehicle, the forklift vehicle stops for the static measurement of the object's dimensions in a specific area in or aside of the conveying path, where a scanning system is mounted overhead. For measurement of the object's dimensions during its transportation, sensors can also be installed on the forklift vehicle itself.

U.S. Pat. No. 6,611,787 discloses an apparatus and method to weigh and dimension objects moving along a conveyor. The apparatus involves three identical ultrasonic sensors deployed along a conveyor belt that moves the objects to be dimensioned and each of the three sensors is designated to determine one aspect of the object's dimension namely length, width and height. The patent also mentions the use of an automated guided vehicle (AGV) to move objects past sensors; however, it does not explicitly disclose a method or arrangement of sensors along a path for the same. An aspect of this patent that represents a disadvantage is the use of the conveyor belt to move objects for dimensioning. This particularly implies a slowing down of the flow of operation in a warehouse during the step of dimensioning because the vehicle carrying objects would have to stop to load objects on a conveying belt followed by dimensioning and then reloading them back onto a truck.

Additionally, such conveyor oriented systems can be effective for small parcels that are bundled downstream of the conveyor however, they prove inefficient time-wise when dimensioning larger objects such as those that have to be transported on pallets by a forklift vehicle.

A mobile product-dimensioning system is disclosed in U.S. Pat. No. 7,757,946 allows a vehicle carrying an object to be dimensioned to pass through an enclosure namely a tunnel that has a dimension detection device mounted on it. The system is equipped to measure the dimension and weight of the vehicle with the pallet moving through the tunnel.

While the tunnel dimensioning system overcomes the shortcoming of employing a conveyor belt, one particular disadvantage of such a tunnel passage for dimensioning is that these systems are installed on the floor which leads to an obstruction in the floor space. Such floor installations are prone to damage by moving vehicles which in turn may lead to a slow-down of warehouse operations.

On the other hand, U.S. Pat. No. 6,115,114 discloses an apparatus and method wherein a forklift vehicle carrying an object to be dimensioned is allowed to pass under a mounted laser scanner sensor system. This system does not describe the use of a tunnel or a defined floor-installed passageway. It makes use of three retroreflectors that are mounted along a center line and on top of the moving forklift vehicle and in turn, the laser scanning sensors are mounted in relation to these retroreflectors.

The retroreflectors provide time and space reference for volumetric measurements of the parcel. However, the retroreflectors necessitate a modification of the forklift vehicle.

In view of this, it would be helpful to develop a scanning system that does not involve modifications of transporting machinery.

SUMMARY

It is an objective of the present invention to provide a system and method to dimension objects transported by a forklift vehicle while the forklift vehicle is in motion.

It is a further objective of the present invention to provide a system and method to dimension objects transported by a forklift vehicle moving along an area of measurement such that it ensures a time-efficient measurement wherein the forklift vehicle does not have to stop during a dimension measurement cycle.

It is a further objective of the present invention to provide a system and method to dimension objects transported by a forklift vehicle moving in an area of measurement at any speed and direction within reasonable limits.

With the above objectives in view, the present invention discloses a system and its corresponding method to dynamically dimension an object transported by a forklift vehicle according to the independent claims.

According to the present invention in one aspect, there is provided a system for measuring the dimension of an object on a pallet transported by a forklift vehicle while it is in motion within an area of measurement. The object herein described may be a parcel, package, consignment etc and will be referred to as object in this invention.

The dimensioning system comprises an adjustable arrangement of a plurality of laser scanner heads, which herein will be referred to as scanners. The plurality of preferably identical scanners comprises at least three scanners that are arranged on either side of the area of measurement.

A first scanner is disposed on a first side of the area of measurement and a second scanner is disposed on a second side opposite the first side of the area of measurement, and across the first scanner. The first scanner and the second scanner form a dual-head scanner arrangement and the combination of this dual-head scanner arrangement of the two scanners is configured to capture dimensions of the object in order to provide a three dimensional image of the object. A third scanner is disposed on the first side of the area of measurement and oriented parallel to the first scanner and said third scanner together with said first scanner are configured to capture speed and direction of the object transported by the moving forklift vehicle.

Each of the plurality of scanners comprises processor means, configured to operate each of the scanners. The system comprises synchronizing means configured to synchronize operation of the first scanner with the second scanner to capture dimension data of the object, and correlating means configured to correlate operation of the first scanner with the third scanner in order to capture speed and direction of the object.

The placement of the first and second scanners establishes a width of the area of measurement within which the forklift vehicle can move in any direction. Furthermore, the placement of the first and third scanners establishes a length of the area of measurement.

An advantageous feature of this invention is that the provision of multiple scanners overlooking a moving forklift vehicle provides a view of the object from all the sides. Additionally, the dimensioning system does not involve any modification of the forklift vehicle. Furthermore the system provides the opportunity for forklift vehicles to enter from either side into the area of measurement.

The system according to the present invention further comprises a fourth scanner that is disposed within the area of measurement at a predefined height from a floor of the area of measurement. The fourth scanner further comprises an attachment having a wall, such that the fourth scanner is oriented to provide a field of view in a plane that is preferably oriented perpendicular to the wall of the attachment of the fourth scanner. Further, the field of view of the fourth scanner is directed towards the underside of the object carried by the pallet on the forklift vehicle. The advantageous feature of the placement of the fourth scanner allows the fourth scanner to obtain a field of view of the underside of the object on the pallet that is transported by the forklift vehicle. Preferably, this feature allows capture of a complete view of the object on the pallet from below, especially in cases where the object fully covers the pallet which in turn may make taring of the pallet difficult. Additionally, the forklift vehicle lifts the object and tilts it backwards and then, places it on the pallet so that it stays in place. Therefore, the fourth scanner is configured to capture the height and tilt of the object placed on the pallet.

In an advantageous embodiment said second scanner on the second side of the area of measurement is adjustably disposed in order to adjustably establish the width of the area of measurement.

Preferably the first scanner, the second scanner and the third scanner are adjustably fixed on a rail mounted above the area of measurement.

Furthermore, the forklift vehicle is configured with a forklift scale to weigh the object lifted by the pallet in order to record its weight. Therefore, the dimensioning system captures the dimension of the object, weight of the object, height and tilt of the object, and the speed and direction of the moving forklift vehicle within the area of measurement.

In an exemplary embodiment the object carried by the pallet on the forklift vehicle is identified before, while or after being dimensioned by means of a machine readable code present on the object. The identification code may be read by an identification means in order to capture identification data of the object.

The dimensioning system according to the present invention can be provided with a visual signal unit installed on the forklift vehicle and/or close to the area of measurement that provides visual indication to a driver of the forklift vehicle transporting the object to be dimensioned. An advantageous embodiment of said visual signal unit comprises a traffic light including three or more visual indication signals providing visual indication for success, failure or completion of dimensioning the object to be dimensioned. Alternatively, said visual signal unit comprises a display unit providing messages to a driver of the forklift vehicle.

A method for measuring the dimension of an object according to the present invention such that the method proves to be time efficient in an LTL environment by dynamically dimensioning objects transported by the forklift vehicle as it moves within the area of measurement at a reasonable speed and direction.

The method according to the present invention for measuring the dimension of an object on a pallet transported by a forklift vehicle comprising forks moving within an area of measurement, the method comprises the following steps:

Establishing the area of measurement by means of an arrangement of a plurality of scanners by:
  providing a first scanner on a first side,
  providing a second scanner on a second side, opposite to the first side and across the first scanner; wherein a width of the area of measurement is established by the distance between the first scanner and second scanner;
  providing a third scanner on the first side and parallel to the first scanner; wherein a length of the area of measurement is established by the distance between the first scanner and third scanner; the method of dimensioning;
placing an object on a pallet on the forks of the forklift vehicle,
moving the forklift vehicle into the area of measurement,
determining by the first and second scanners the dimension of the object, determining by the first and third scanners the speed and direction of the forklift vehicle carrying the object, and
determining a dimension of the object on the pallet carried on the forklift vehicle, wherein the speed and direction data are used to correct the dimension data as measured by the first and the second scanner.

BRIEF DESCRIPTION OF THE DRAWINGS

Other features and advantages disclosed herein will become more apparent from the following detailed description of exemplary embodiments when read in conjunction with the attached drawings, wherein.

DETAILED DESCRIPTION

Figure 1:
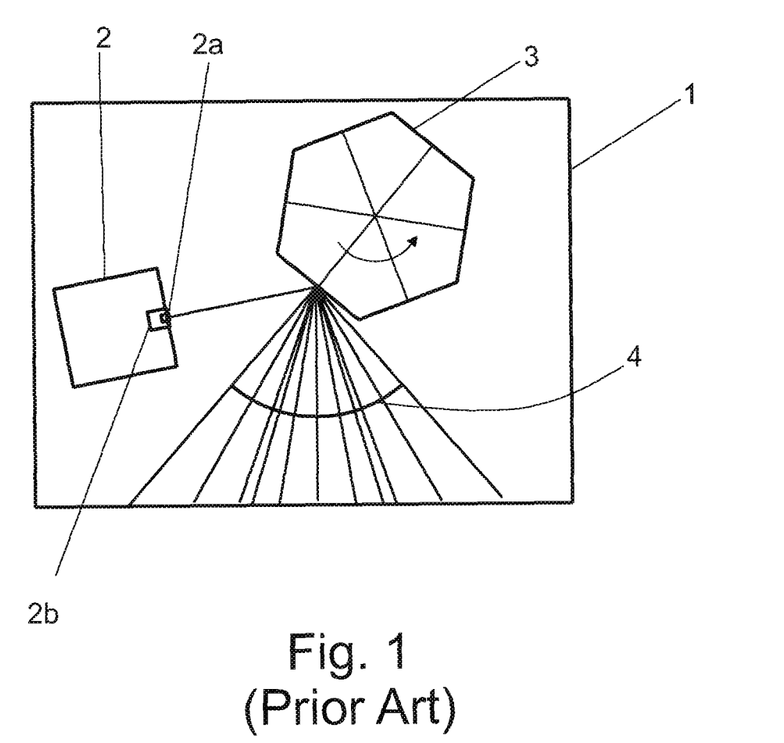
FIG. 1 is a diagram showing components present within a typical scanner head illustrating a principle of measurement using a laser scanner head.

FIG. 1 schematically shows components present within a typical laser scanner head 1 (herein referred to as scanner as mentioned above) illustrating a principle of measurement using a scanner apparatus for measuring the dimensions of an object. As described in EP 0 705 445 B1, the scanner comprises a laser transmitter 2a operating as an illumination device and a photodetector 2b operating as a receiving device. The housing of the scanner contains the transmitter/receiver arrangement 2 with the laser transmitter 2a and the photodetector 2b as well as a rotating polygon hexagonal mirror 3. The rotating polygonal hexagonal mirror performs a scanning sweep for the modulated light emitted from the laser transmitter 2a as well as the light received by the photodetector 2b over a wide scanning sector 4, wherein the sweep of the light beam defines a plane. The scanner further comprises a processor (not shown) for controlling the scanner operation and for calculating the time it takes for the light beams to travel to and from the object.

As the rotating polygon hexagonal mirror 3 presents a continuously changing reflection surface to the incident laser beam, the latter sweeps across the object and generates an illuminated line on the object.

Figure 2:
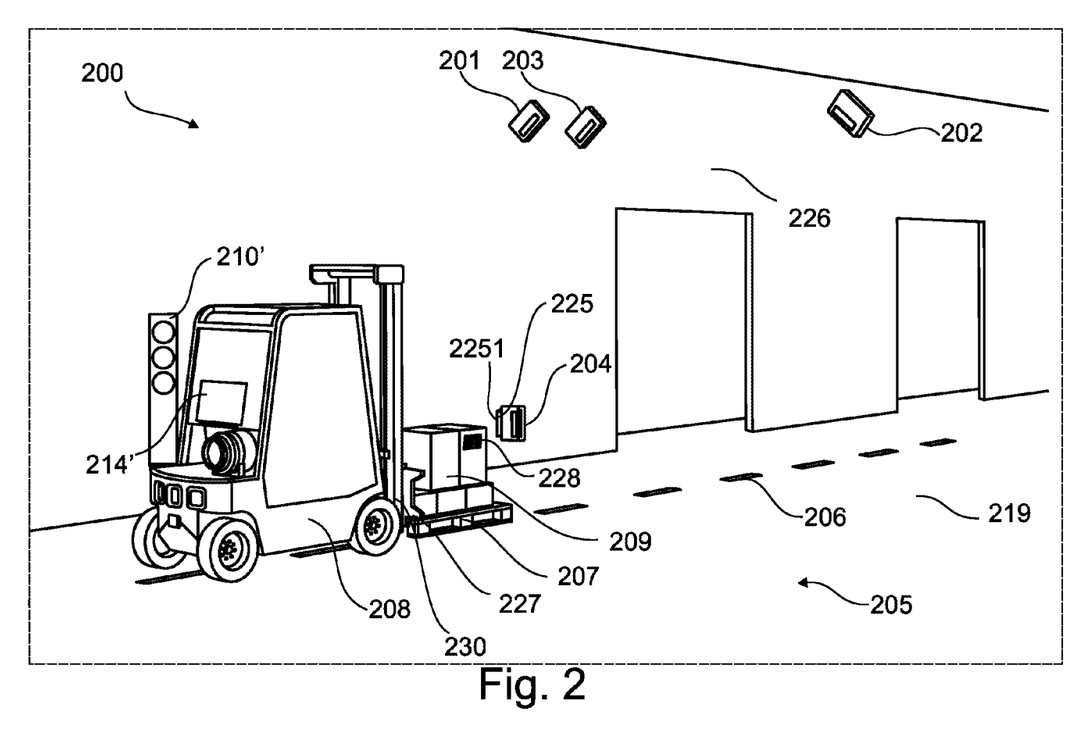
FIG. 2 is a simplified diagrammatic illustration of an exemplary dimensioning system showing an exemplary arrangement of laser scanner heads for dimensioning of an object on a pallet transported by a forklift vehicle moving in an area of measurement according to the present invention.

FIG. 2 is a simplified diagrammatic illustration of a dimensioning system 200 showing an exemplary arrangement of scanners for dimensioning an object 209 on a pallet 207 transported by a forklift vehicle 208 moving in an area of measurement 205. The dimensioning system 200 includes an arrangement of three identical scanners namely a first scanner 201, a second scanner 202, and a third scanner 203 that are provided in the area of measurement 205. The first scanner 201, second scanner 202 and third scanner 203 are arranged at an angle of preferably in the range of 0 degrees to 60 degrees, preferably between 30 to 40 degrees, from a ceiling 218 (FIG. 4) of the area of measurement 205.

The first scanner 201, the second scanner 202, and the third scanner 203 are arranged over the area of measurement 205. A fourth scanner 204 is arranged at a distance from a floor 219, preferably at a predefined height from the floor 219 of the area of measurement 205. The fourth scanner 204 comprises an attachment 225 having a wall 2251. The fourth scanner 204 is mounted to a side wall 226 in the area of measurement 205 by fixing the attachment 225 to the side wall 226.

Figure 4:
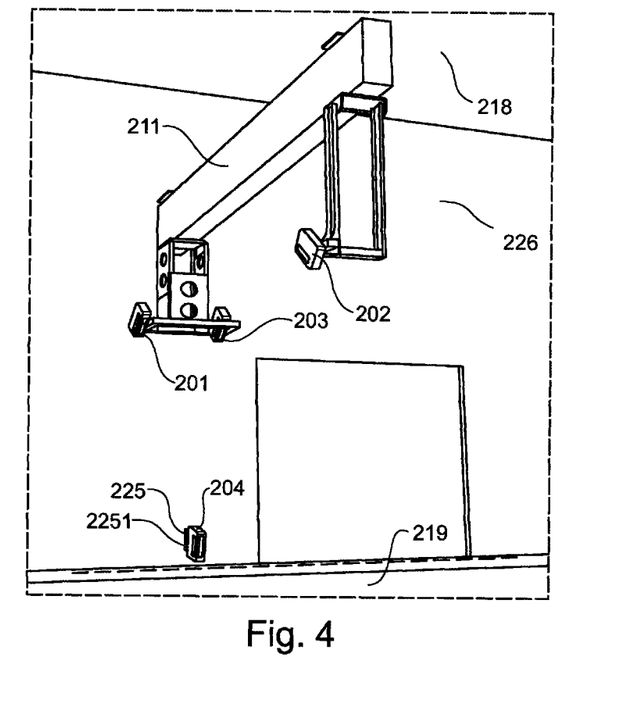
FIG. 4 is a simplified side view of an exemplary dimensioning system wherein the laser scanner heads are shown to be mounted on an overhead rail according to the present invention.
Figure 5:
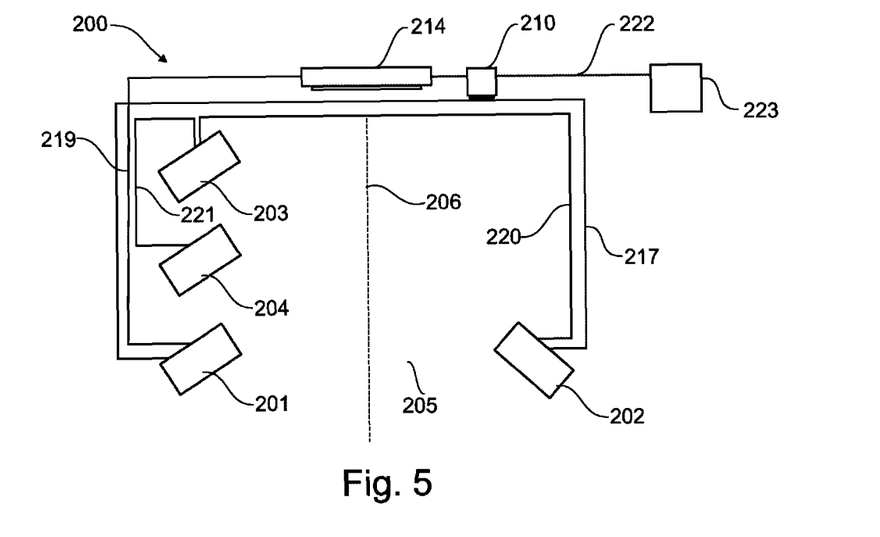
FIG. 5 shows a block diagram of an exemplary interconnection between components present in the dimensioning system according to the present invention.
Figure 6:
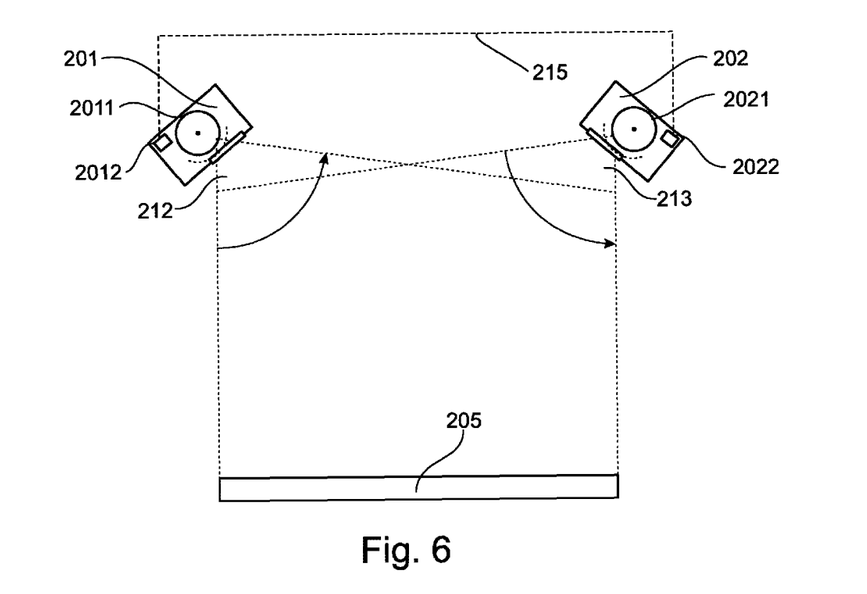
FIG. 6 shows fields of view generated from first scanner and second scanner as a part of the exemplary dimensioning system according to the present invention.

As illustrated more clearly in the FIGS. 4, 5 and 6, the first scanner 201, third scanner 203 and fourth scanner 204 are arranged on the same side A of the area of measurement 205 whereas the second scanner 202 is arranged on the other side B of the area of measurement 205. Further, FIG. 4 shows a simplified side view of an exemplary dimensioning system 200 wherein the scanners 201, 202 and 203 are shown to be mounted on a rail 211 mounted above the area of measurement 205.

The first scanner 201 and second scanner 202 are forming a so-called dual-head scanner arrangement which is configured to detect the dimensions and provide a three dimensional image of the object 209 that is transported by the forklift vehicle 208 in the area of measurement 205. The third scanner 203 is configured to measure the speed and direction of the forklift vehicle 208 in collaboration with the first scanner 201, and the fourth scanner 204 is configured to capture the height and tilt of the object 209 that is carried by the forklift vehicle 208. All the four preferably identical scanners are configured with laser diodes to emit modulated laser beams in the visible spectrum preferably with a pattern with a frequency in the range of 10-100 MHz. The four identical scanners emit visible modulated beams, for example at a wavelength of 660 nm.

The forklift vehicle 208 is free to move in any direction within an angle of about +/−25 degrees with respect to a central line 206 and at any reasonable speed within the area of measurement 205 while measurements are being carried out. In this manner the forklift vehicle 208 can enter from either side into the area of measurement i.e. from first scanner 201 to third scanner 203 as indicated by direction I in FIG. 3 or from third scanner 203 to first scanner 201 as indicated by direction II in FIG. 3. The forklift vehicle 208 further comprises an integrated forklift scale 227 (See FIG. 2) that measures the weight of the object 209 transported by a forklift vehicle 208 without stopping the forklift vehicle 208. The measurements of speed and direction from collaboration between the first scanner 201 and the third scanner 203, and height and tilt of the object 209 from the fourth scanner 204 are used as inputs to the dimensioning process in the form of correction factors that are applied to acquire the final dimension measurements of object 209. The measurements of direction and tilt are used to rotate the three dimensional image of the object 209. The measurement of height is used to tare the pallet 207 at zero height carrying the object 209. The measurement of speed is used to determine the correct distance between scans that are recorded by first scanner 201 and second scanner 202.

Figure 3:
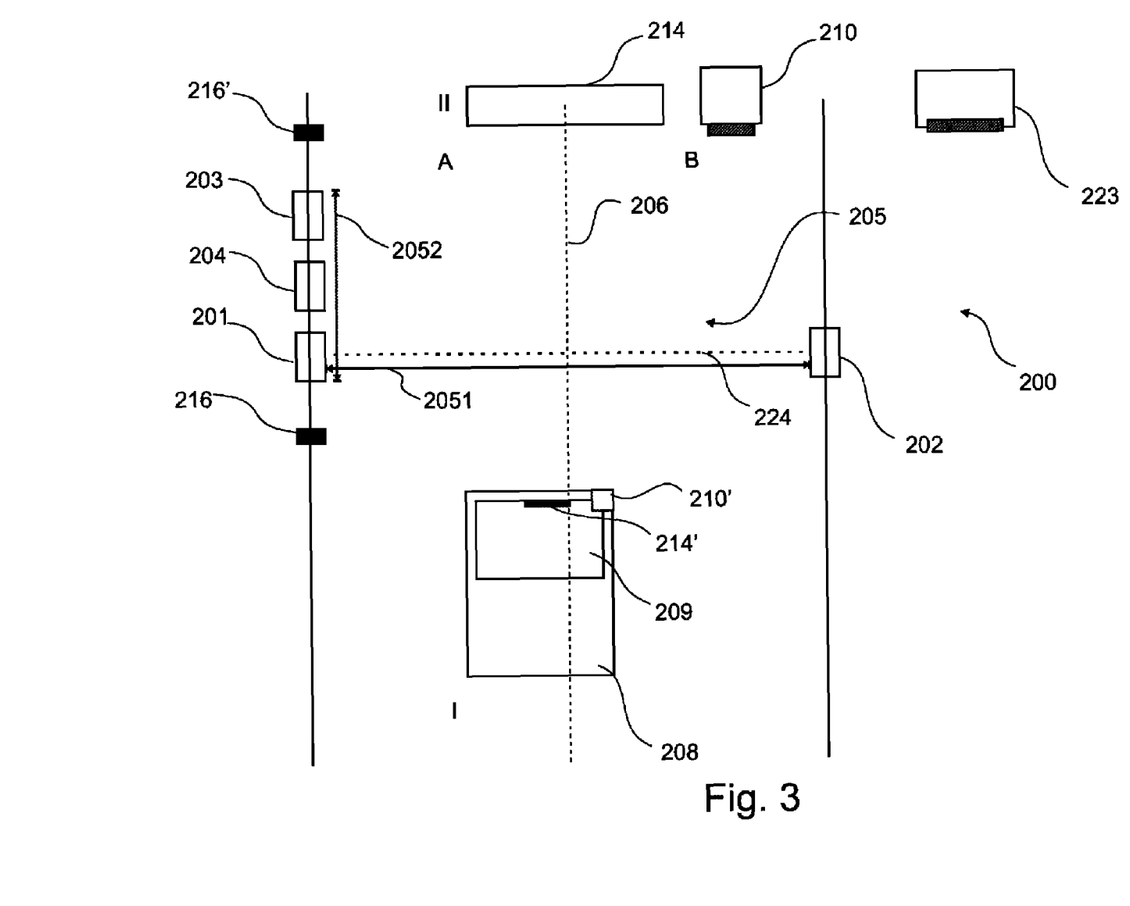
FIG. 3 is a simplified top view of an exemplary dimensioning system according to the present invention.

Further as shown in FIG. 3, central line 206 is depicted for visual illustration purposes only for the understanding of this invention. Central line 206 divides the area of measurement 205 into two sections, namely section A side and section B side.

The first scanner 201, second scanner 202, third scanner 203 and fourth scanner 204 are mounted in a spatial arrangement in relation to each other. FIG. 3 provides a simplified top view of an exemplary dimensioning system 200 wherein the first scanner 201 and second scanner 202 are shown to be across from each other in section A side and B side, respectively, and along a line 224 that is perpendicular to central line 206. Preferably, they are placed across from each other such that they span the width 2051 of the driveway used by the forklift vehicle 208. Furthermore, FIG. 4 shows the first scanner 201, second scanner 202 and third scanner 203 to be mounted overhead the area of measurement 205 by means of the rail 211 thus facilitating the width 2051 of the area of measurement 205 to be adjustable in order to span the width of the driveway used by the forklift vehicle. Thus, the first scanner 201 and second scanner 202 are arranged as dual-head scanner arrangement to obtain a different field of view of the object 209 in the area of measurement 205. Line 224 indicates the joint line that is touched by the fields of view of transmitted laser beams from the first scanner 201 and second scanner 202 and is preferably oriented perpendicular to central line 206.

As previously explained, the first scanner 201 and second scanner 202 are positioned across from each other along line 224 perpendicular to central line 206 to observe the object 209 carried by the moving forklift vehicle 208 by the dual-head scanner arrangement. This allows a view of the object 209 to be dimensioned from above but from different angles, i.e. from both sides, so that the height can be captured.

Third scanner 203 is disposed at a distance, preferably between 1 to 1.5 m, from first scanner 201, such that it lies parallel to the first scanner 201 in the section A side. Preferably, third scanner 203 is disposed at a distance of between 0.5 to 2 m from first scanner 201 or preferably, between 1 to 2 m from first scanner 201. Fourth scanner 204 is disposed in between the first scanner 201 and third scanner 203 when looking along central line 206. As shown in FIGS. 2 and 4, the first scanner 201, second scanner 202 and third scanner 203 are positioned at the same height from the floor 219 of the area of measurement 205 along which the forklift vehicle 208 moves. In alternative embodiment, the first scanner 201, second scanner 202 and third scanner 203 may be mounted on the side wall 226 or the rail 211, as shown in FIG. 4. The fourth scanner 204 is mounted at a predefined height from the floor 219, lower than the height of the first scanner 201, second scanner 202 and third scanner 203. Preferably, the fourth scanner 204 is mounted at a height of 10 to 50 centimeters from the floor 219 of the area of measurement 205. In particular, this height is such that it allows the fourth scanner 204 to view the underside of the object 209 placed on the pallet 207 that is transported by the forklift vehicle 208.

As shown in FIG. 3, the dimensioning system 200 may further be equipped with a visual signal unit 210, 210' such as a traffic light or a display unit 214' that provides messages to the driver of the forklift vehicle in order to signal a status of the dimension measurement.

The exemplary dimensioning system 200 according to FIG. 3 further includes identification means 216, 216' that are present to identify an object 209 carried by a forklift vehicle 208 entering an area of measurement 205. This is necessary in order to get knowledge of the unique identity of the object and its destination. This requirement can be achieved by having a barcode or a matrix code 228 (FIG. 2) applied to the object that can be read out by identification means 216, 216' located within or outside the area of measurement. As an alternative RFID readers reading RFID tags on the objects can also be used. The identification means 216 or 216' may also be integrated in one of the scanners i.e. first scanner 210, second scanner 202, third scanner 203, or fourth scanner 204.

The dimensioning system 200 according to FIG. 3 may further include a display unit 214, 214' visible to a driver of the forklift vehicle 208 to display measurement results. A remote processing unit 223 may be installed at a remote location to display and/or further process the data as received from the dimensioning system 200 and the scale (not shown in the figures) integrated in forklift vehicle 208.

FIG. 5 shows a block diagram of an exemplary interconnection between components present in the dimensioning system. As depicted in FIG. 5, a physical wiring is shown between the first scanner 201, second scanner 202, third scanner 203, fourth scanner 204, remote processing unit 223 via control line 222, visual signal unit 210, and display unit 214. The first scanner 201 is usually assigned to function as a master scanner while the second scanner 202, third scanner 203 and fourth scanner 204 are assigned to function as slave scanners. The fourth scanner 204 functions as a slave scanner and communicates via wire 221 the height and tilt of the object 209 it measures. The third scanner 203 functions as a slave scanner and communicates via wire 220 the speed and direction of the forklift vehicle 208 in the area of measurement 205. The second scanner 202 functions as a slave scanner and communicates via wire 217 the speed and direction of the forklift vehicle 208 in the area of measurement 205. The first scanner 201 communicates measurement results to a further remote processing unit 223 via wire 222 and/or displays measurements results on the display unit 214. It is also connected to the visual signal unit 210. As described earlier, first scanner 201 and second scanner 202 function as dual-head scanners in order to capture the dimensions of the object 209 on the pallet 207 transported by the forklift vehicle 208. The first scanner 201 provides final dimensioning measurement results by including correction factors for measurements measured by third scanner 203 and fourth scanner 204.

As all of the scanners in the system are preferably identical in nature, the role of master scanner and slave scanners can easily be exchanged among them. The processor means of the first scanner 201, second scanner 202, third scanner 203 and/or the fourth scanner 204 comprise synchronization means, i.e. a synchronizer in order to synchronize operation of the dual-head scanner arrangement.

The dual-head scanner arragement comprising the first scanner 201 and the second scanner 202 is shown in FIG. 6. The first scanner 201 comprises a first rotating polygon hexagonal mirror unit 2011, and a first clock 2012. The second scanner 202 comprises a second rotating polygon hexagonal mirror unit 2021, and a second clock 2022. As seen in the figure, the first scanner 201 and the second scanner 202 are positioned to look down at the same scan line so that they scan in relation to each other. In order to avoid interference of the illumination and receiving light from the first scanner 201 and second scanner 202, the first rotating polygon hexagonal mirror unit 2011 and the second rotating polygon hexagonal mirror unit 2021 are synchronized in such a way that they intermittently scan over the object 209. The synchronization ensures that the two scanners are producing twice as many scan lines of a defined distance as compared to a single scanner. Usually, this synchronizing of the polygons can be achieved by use of a wired communication 217 (See FIG. 5) between the first scanner 201 and the second scanner 202. Alternatively, this can also be achieved by synchronizing the first clock 2012 of the first scanner 201, and the second clock 2022 of the second scanner 202 over a network 215 with unpredictable time delay well-known as an asynchronous communication network.

Preferably, the rotating polygons hexagonal mirror units of the first scanner 201 and second scanner 202 rotate at 2500 rpm.

An additional advantage of doubling the number of scan lines as compared to a single scanner deployed over a conveying path is that the latter would produce fewer scan lines when the object to be dimensioned is in motion. To overcome this, the two scanners of the dual-head scanner arrangement are employed over the conveying path of the object to be dimensioned such that more scan lines and consequently a higher precision of the measurement of dimensions of an object are achieved.

In addition the processor means includes correlation means, i.e. a correlator to correlate operation of the first scanner 201 with the third scanner 203 in order to capture speed and direction of the forklift vehicle 208. The processor means also includes correction means to correct dimensions as measured by the dual-head scanner arrangement for errors that arise from a direction of the forklift vehicle deviating from a straight line (for example along center line 206) and for height and tilt as captured by the fourth scanner 204.

Synchronization means, correlation means and correction means are preferably embodied as software that is run within the processor means.

In an exemplary embodiment, the measurement results are displayed on a display unit 214 in the vicinity of the area of measurement 205. In other exemplary embodiments the measurement results may be displayed on a remote processing unit 223.

In another exemplary embodiment, the measurement results are made available to the driver of the forklift vehicle 208 by displaying the measurement results on a display unit 214' (FIG. 2) inside the forklift vehicle 208.

Further, FIG. 6 illustrates the fields of view generated from a dual-head scanner arrangement formed by first scanner 201 and second scanner 202 as a part of the dimensioning system 200. As previously described, each scanner comprises a rotating polygonal hexagonal mirror unit that is used to spread out the received laser light beam and to pick up the light spread towards the receiver in a fan-shaped beam. Thus, the object 208 to be dimensioned is scanned in one axial direction as shown by the fan shaped scans 212 and 213 from first scanner 201 and second scanner 202 respectively.

Figure 7:
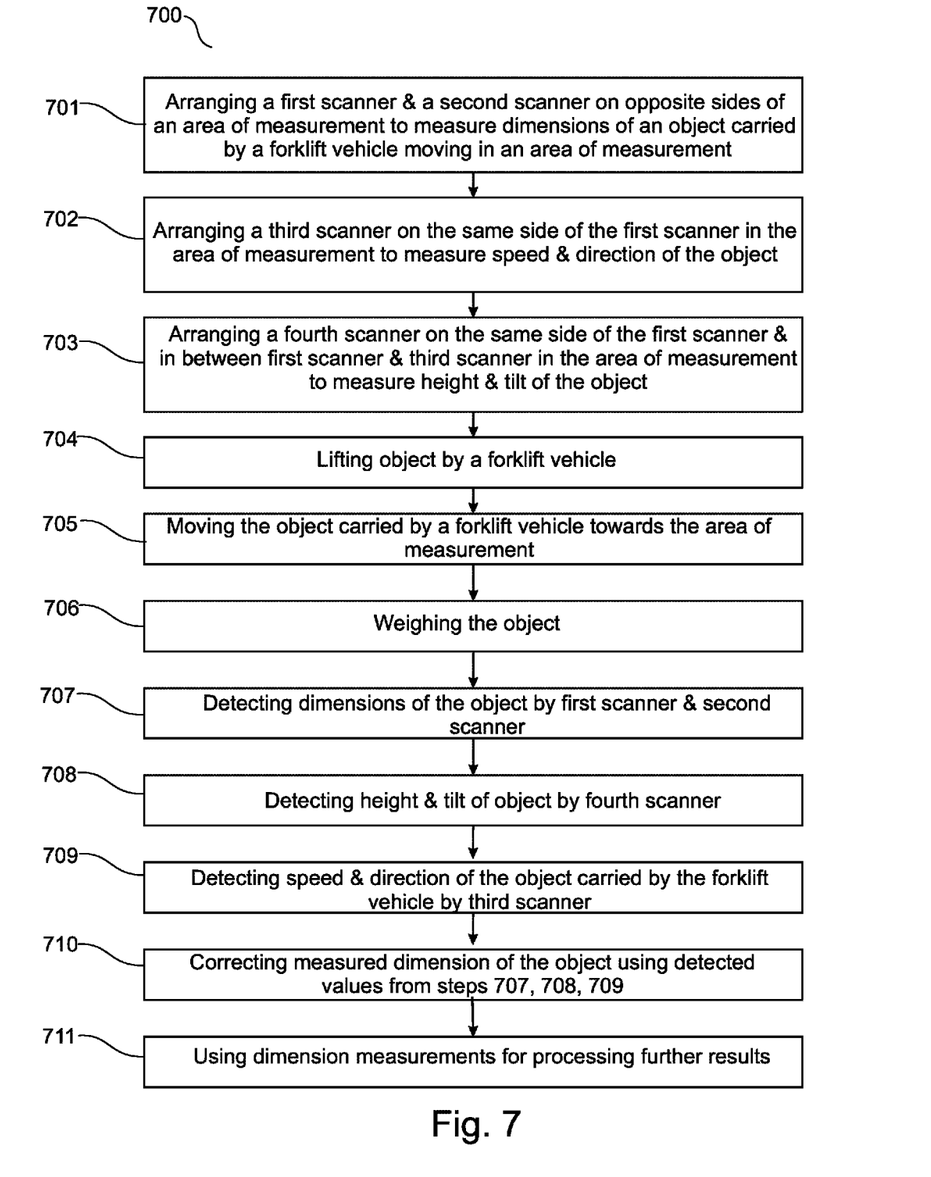
FIG. 7 shows a block diagram of an exemplary method for performing a dimensioning measurement on an object carried by a forklift vehicle moving in an area of measurement.

FIG. 7 shows a flow chart of an exemplary method 700 for performing a dimensioning measurement on an object 209 placed on a pallet 207 carried by a forklift vehicle 208 moving in an area of measurement 205. The method 700 includes establishing an area of measurement by steps 701, 702 and 703. The method 700 includes arranging a first scanner 201 and a second scanner 202 on opposite sides of an area of measurement 205 in a dual-head scanner arrangement to measure dimensions of an object 209 carried by a forklift vehicle 208 at step 701. The method 700 further includes as per step 702 arranging a third scanner 203 on the same side of the first scanner 201 and with same orientation of its field of view in the area of measurement 205 to measure speed and direction of the object 209 carried by a forklift vehicle 208. The method 700 further includes step 703 of arranging a fourth scanner 204 on the same side of the first scanner 201 and preferably in between first scanner 201 and third scanner 203 in the area of measurement 205 to measure height and tilt of the object 209 carried by a forklift vehicle 208.

According to steps 704 and 705, the method 700 further includes lifting the object 209 by the forklift vehicle 208, transporting the object 209 through the area of measurement 205 to its destination. While the object 209 is transported by forklift vehicle 208 under the scanners 201, 202, 203 and 204 the dimension of the object is detected. Immediately after lifting the object or during movement of the forklift vehicle the weight of the object 208 is captured and stored in step 706.

When a forklift vehicle 208 is detected in the area of measurement 205, the first scanner 201 and the second scanner 202 initiate a scan cycle to capture the dimensions of the object (step 707). As the object moves between first scanner 201 and third scanner 203, scan images are taken by the first scanner 201 and third scanner 203 respectively (step 709). The scan images are correlated by the correlating means (not shown in the figures) to determine the time shift of the moving forklift vehicle 208 within the area of measurement 205. Since the distance between the first scanner 201 and third scanner 203 is known, the time shift measurements determined by the correlating means provide the speed and direction of the moving forklift vehicle 208.

As described earlier, the fourth scanner 204 is present in between first scanner 201 and third scanner 203 and is disposed at a predefined height from the floor of the area of measurement 205 in order to capture the height and tilt of the object 209 on a forklift vehicle 208. The fourth scanner 204 is oriented to provide a field of view in a plane that is preferably oriented perpendicular to a wall 2251 of an attachment 225 of the fourth scanner 204. The field of view of the fourth scanner 204 is directed towards the underside of the object 209 on the pallet 207 transported by the forklift vehicle 208 and subsequently determine its height and tilt as illustrated by step 708.

The measurements as determined by the first scanner 201, second scanner 202, third scanner 203 and fourth scanner 204 are used to determine a corrected dimension of the object 209 to be dimensioned on a moving forklift vehicle 208 as illustrated by step 710.

Subsequently, the measurement results of dimensions and weight of the object 209 are forwarded to a remote processing unit 223 as illustrated by step 711. Further processing using calculated corrected dimensions of the object can preferably be executed by a remote processing unit 223 or can also be achieved by above mentioned processor means within the master scanner.

An exemplary method 700 may include identifying the object 209 carried by the forklift vehicle 208 prior to or after dimensioning measurement in the area of measurement 205. This is necessary in order to get knowledge of the unique identity of the object and its destination. This requirement can be achieved by having a barcode or a matrix code 228 applied to the object 209 that can be read out by an identification means 216 or 216' located within or outside the area of measurement 205. As an alternative RFID readers reading RFID tags on the objects can also be used. An exemplary method step 700 may also include displaying the measurement results on a display unit 210 in the vicinity of the area of measurement 205. In addition or alternatively the measurement results are forwarded to a remote processing unit 223 either via a wired wire 222 or a wireless connection and may be displayed and/or further processed in said remote processing unit.

An alternative exemplary method 700 includes displaying the measurement results for the driver of the forklift vehicle 208 for example by a display screen 214' that may be installed on/inside the forklift vehicle 209.

Figure 8:
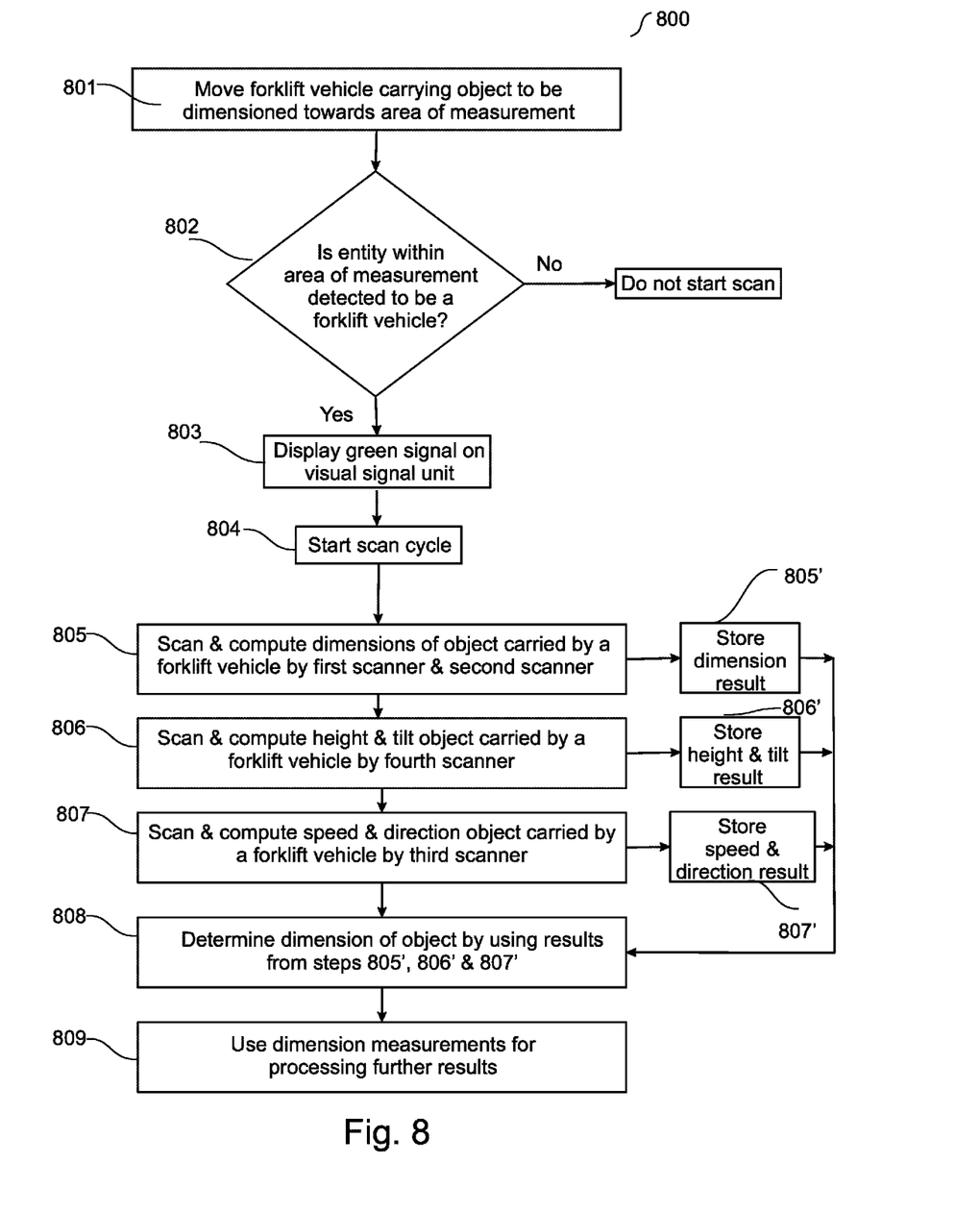
FIG. 8 is a flow diagram of an exemplary scan cycle for a dimensioning system according to the present invention.

FIG. 8 shows an exemplary scan cycle 800 for a dimensioning system according to the present invention. According to FIG. 8, in step 801 a forklift vehicle 208 carrying an object 209 to be dimensioned is moved towards an area of measurement 205. A program running for example in a processor of a master scanner, namely first scanner 201, determines whether an entity detected in the area of measurement 205 is the forklift vehicle 208 transporting the object 209 as illustrated by step 802.

Furthermore, the visual signal unit 210 of the dimensioning system 200 is capable of outputting visual signals to a driver of the approaching forklift vehicle 208 by three signal colours. When the visual signal unit 210 displays a green colored signal it signifies that the area of measurement 205 of the dimensioning system 200 is ready for measurement (step 803) and the scan cycle can start (step 804). When the visual signal unit 210 displays a yellow colored signal it signifies that the area of measurement 205 of the dimensioning system 200 is engaged in determining a dimensioning measurement for the forklift vehicle 208 within the area of measurement 205. Preferably, when the visual signal unit 210 displays a red colored signal it signifies that the measurement process was not completely or successfully carried out and the resulting dimensional measurement of the object 209 was not determined successfully. When the visual signal unit 210 displays a green colored signal again, it signifies that the measurement process was completely carried out and the resulting dimensional weight of the object 209 was determined successfully.

The method 800 then further includes step 805 wherein the dimensions of the object 209 carried by the forklift vehicle 208 are determined by scanning the object 209 by first scanner 201 and second scanner 202 and storing the results at step 805'. As the forklift vehicle 208 advances ahead, it passes in front of the fourth scanner 204 wherein the height and tilt of the object 208 are measured and stored as shown by steps 806 and 806' in FIG. 8. The method 800 further includes step 808 wherein the speed and direction of the object 209 carried by forklift vehicle 208 are determined by the third scanner 203 and stored in step 807'. According to the method, steps 806 and 807 involve the storage of the measured results 806', 807' as computed by the fourth scanner 204 and third scanner 203 in order to provide a correction factor to determine the final dimensions of the object 209 while it is in motion on the forklift vehicle 208, as depicted by step 808. The correction factor takes into account a deviation of the forklift vehicle's movement from a direction along central line 206 under an angle taken into consideration. In addition it is taking a slightly tilted placement of the object 209 placed on the pallet 207 on the forklift vehicle 208 into consideration. The mathematical calculation of the correction factors is preferably based on simple trigonometric functions. In addition to these steps, the dimensioning measurement as acquired in step 808 may be further processed to provide additional results.

In an exemplary method, the forklift vehicle 208 is moved towards the area of measurement from a side opposite to the side described above, i.e. direction II as indicated in FIG. 3.

It will be appreciated by those skilled in the art that the present invention can be embodied in other specific forms without departing from the spirit or essential characteristics thereof. A dimensioning system as described may also be set up with dimensioners operating on other technologies, for example, laser range finder technology or triangulation technology. The presently disclosed embodiments are therefore considered in all respects to be illustrative and not restricted. The scope of the invention is indicated by the appended claims rather than the foregoing description and all the changes that come within the meaning and range and equivalence thereof are intended to be embraced therein.

What is claimed is:

1. A system for measuring the dimensions of an object transported on a pallet by a moving forklift vehicle, the system comprising:
    a plurality of scanners, arranged in an adjustable manner to define an area of measurement within which the object moves, comprising;
        at least one first scanner, disposed on a first side of the area of measurement;
        at least one second scanner, disposed on a second side of the area of measurement that is opposite to the first side thereof and across the first scanner, the respective first and second scanners defining a dual-head scanner arrangement, configured to capture the dimension of the object,
        at least one third scanner, disposed on the first side of the area of measurement and oriented parallel to the first scanner, the respective first and third scanners configured to capture speed and direction of the object;
        wherein each scanner in the plurality of scanner comprises a processor means, configured to operate the scanner, and
    a synchronizing means, configured to synchronize operation of each first scanner with each second scanner, for capturing the dimension of the object, and
    a correlating means, configured to correlate operation of each first scanner with each third scanner, for capturing speed and direction of the object;
    wherein the disposition of the first and second scanners establishes a width of the area of measurement and the disposition of the first and third scanners establishes a length of the area of measurement.

2. The system of claim 1, further comprising:
    at least one fourth scanner, disposed within the area of measurement on the first side thereof at a predefined height above a floor thereof, each fourth scanner configured for capturing height and tilt of the object on the pallet transported by the forklift vehicle.

3. The system of claim 2, wherein:
    each fourth scanner comprises an attachment with a wall, such that the fourth scanner is oriented to provide a field of view in a plane that is preferably oriented perpendicular to the wall, with the field of view of the fourth scanner being directed towards an underside of the object transported by the pallet on the forklift vehicle.

4. The system of claim 3, wherein:
    each second scanner is disposed to adjustably establish the width of the area of measurement.

5. The system of claim 3, wherein:
    each first scanner comprises a first rotating polygon hexagonal mirror unit and a first clock; and
    each second scanner comprises a second rotating polygon hexagonal mirror unit and a second clock, such that each first scanner and each second scanner are paired to form the dual-head scanner arrangement, with the respective rotating polygon hexagonal mirror units being synchronized to intermittently scan over the object, the synchronization of the respective rotating polygon hexagonal mirror units achieved either by use of a wired communication between the respective scanners or by coordinating the respective clocks provided within each scanner over a network with unpredictable time delay, that is, an asynchronous communication network.

6. The system of claim 3, wherein each first scanner, each second scanner and each third scanner is adjustably fixed on a rail mounted above the area of measurement.

7. The system of claim 1, wherein:
each second scanner is disposed to adjustably establish the width of the area of measurement.

8. The system of claim 1, wherein:
each first scanner comprises a first rotating polygon hexagonal mirror unit and a first clock; and
each second scanner comprises a second rotating polygon hexagonal mirror unit and a second clock, such that each first scanner and each second scanner are paired to form the dual-head scanner arrangement, with the respective rotating polygon hexagonal mirror units being synchronized to intermittently scan over the object, the synchronization of the respective rotating polygon hexagonal mirror units achieved either by use of a wired communication between the respective scanners or by coordinating the respective clocks provided within each scanner over a network with unpredictable time delay, that is, an asynchronous communication network.

9. The system of claim 1, wherein each first scanner, each second scanner and each third scanner is adjustably fixed on a rail mounted above the area of measurement.

10. The system of claim 1, wherein the forklift vehicle comprises a forklift scale for weighing the object on the pallet transported by the forklift vehicle.

11. The system of claim 1, further comprising:
an identification means for capturing identification data on the object being transported by the forklift vehicle, the identification data being in the nature of a machine readable code for identifying the object.

12. The system of claim 1, further comprising:
a visual signal unit arranged for providing a visual indication to a driver of the forklift vehicle transporting the object to be dimensioned.

13. The system of claim 12, wherein the visual signal unit comprises a traffic light having three or more visual indication signals, to providing visual indication for success, failure or completion of dimensioning the object to be dimensioned.

14. The system of claim 12, wherein the visual signal unit comprises a display unit providing messages to the driver of the forklift vehicle.

15. A method for measuring the dimensions of an object on a pallet transported on the forks of a forklift vehicle moving within an area of measurement, the method comprising steps of:
establishing an area of measurement by means of an arrangement of a plurality of scanners, the arrangement comprising,
a first scanner, on a first side of the area of measurement,
a second scanner, on a second side of the area of measurement, opposite to the first side, and across the first scanner; the distance between the respective first and second scanners establishing a width of the area of measurement;
a third scanner, on the first side of the area of measurement and parallel to the first scanner; a distance between the respective first and third scanners establishing a length of the area of measurement;
placing an object to be dimensioned on a pallet on the forks of a forklift vehicle;
moving the forklift vehicle into the area of measurement;
determining, by the first scanner and second scanner, the dimensions of the object;
determining, by the first scanner and third scanner, the speed and direction of the forklift vehicle transporting the object; and
correcting the dimensions, as measured by the first scanner and the second scanner, of the object by accounting for the determined speed and direction of the forklift vehicle while in the area of measurement.

16. The method of claim 15, further comprising the step of:
further correcting the dimensions of the object being transported by the substeps of:
measuring a height and a tilt of the object being transported, using a fourth scanner, arranged relative to the respective first to third scanners at a predefined height from a floor of the area of measurement, preferably on the first side of the area of measurement, and
correcting the dimensions, as measured by the respective first to third scanners, of the object by accounting for the measured height and tilt of the object.

17. The method of claim 15, wherein:
the step of determining the speed and direction of the forklift vehicle is accomplished using a correlating means of the first scanner and the third scanner, the correlating means correlating a time difference between an image of the forklift vehicle captured by the first scanner and an image of the forklift vehicle captured by the third scanner as the forklift vehicle moves within the area of measurement between the respective first and third scanners.

18. The method of claim 15, further comprising the step of:
displaying the corrected dimensions of the object, either remotely or on a display unit present in the forklift vehicle.

* * * * *